(No Model.)
T. B. JEFFERY.
PROCESS OF FORMING VEHICLE WHEELS.
No. 397,189. Patented Feb. 5, 1889.
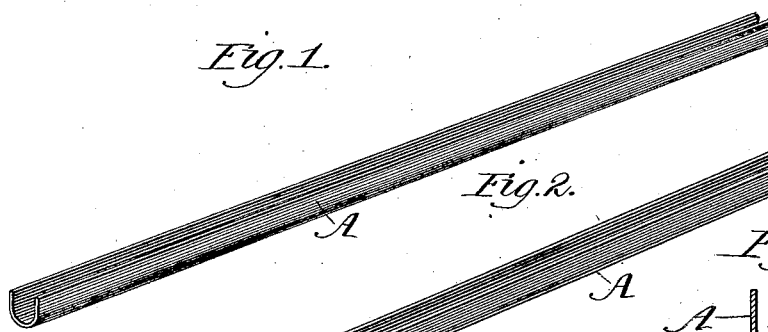
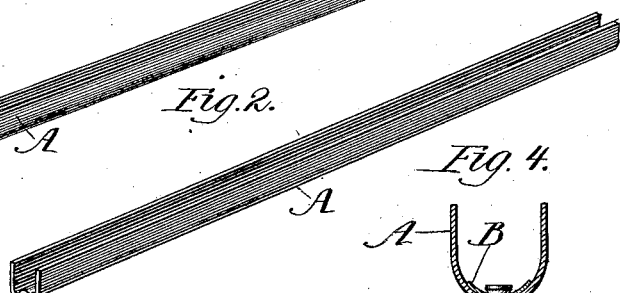
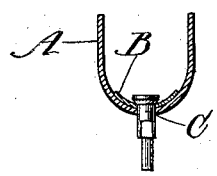
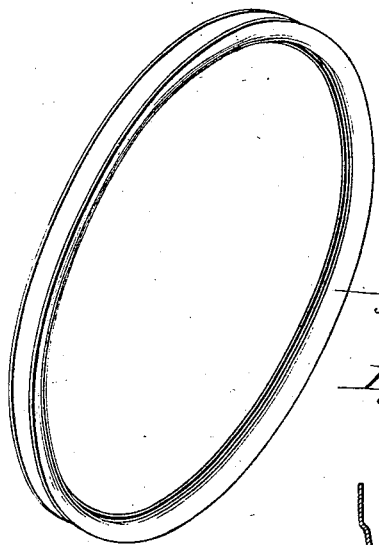
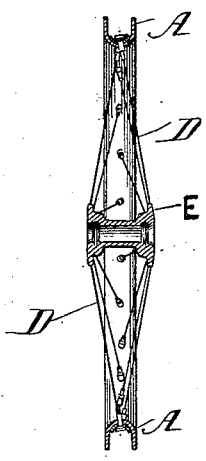
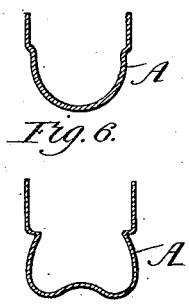
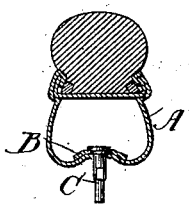
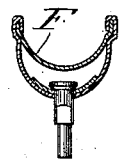
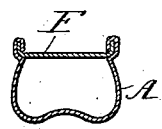
Witnesses:
Jean A. Warriner.
Cora L. Cadwallader.
Inventor:
Thomas B. Jeffery
By Burton & Burton
His Attorneys

UNITED STATES PATENT OFFICE.

THOMAS B. JEFFERY, OF RAVENSWOOD, ILLINOIS.

PROCESS OF FORMING VEHICLE-WHEELS.

SPECIFICATION forming part of Letters Patent No. 397,189, dated February 5, 1889.

Application filed January 20, 1888. Serial No. 261,387. (No model.)

*To all whom it may concern:*

Be it known that I, THOMAS B. JEFFERY, a citizen of the United States, residing at Ravenswood, county of Cook, and State of Illinois, have invented a certain new and useful Improved Process of Forming Vehicle-Wheels, which is fully set forth in the following specification, reference being had to the accompanying drawings, forming part thereof.

Figures 1 and 2 are perspective views of metal troughs from which I form the rim of my wheel. Fig. 3 shows such trough bent into the circumference of the proposed rim. Fig. 4 is a section of the trough to which the strain-bearing pieces have been applied. Figs. 5 and 6 are sections of the trough having shoulders formed at their edges. Fig. 7 is a section of the wheel before the edges of the trough are shouldered. Fig. 8 is a section of the trough having shoulders formed at its edges and the strain-bearing pieces inserted. Figs. 9 and 10 are sections of the rim completed, the edges of the trough being connected by another strip of metal. Fig. 11 is a modification of same with rubber tire inserted.

A is a metal trough; B, a washer therein for the head of the nipple or spoke.

D are the spokes, and E the hub, of the wheel.

F is a strip of metal by which the edges of the trough are connected.

My invention consists of a process of forming vehicle-wheels having hollow metal rims. Heretofore such rims have been made from sheet metal formed into tubes or from tubes formed from solid bars of metal with the core removed, but always completed when in a straight form and afterward rolled into circles the size of the desired wheels. Then apertures have been made in the same for receiving the spokes, and when a separate nut, washer, nipple, spoke-head, or other strain-bearing piece has been needed within the walls of the tube the same has always been inserted after the tube has been completed and holes made in its outer as well as its inner wall, the former being large enough to allow the largest part of such strain-bearing piece to pass through it, and, as far as I am aware, such apertures have been made after the tube has been formed into the circle.

One object of my invention is to dispense with the apertures in the outer wall, and so avoid the weakening of the rim caused thereby.

The second object is to produce a wheel-rim having its circumference more exactly circular than can be accomplished by the old methods of construction.

In my invention, I first form from a strip of sheet metal a segment of a tube or trough of a length sufficient to form the circumference of the rim desired. I then insert the strain-bearing pieces—that is, the pieces which are to bear the strain of the spokes, be they either nuts, washers, nipples, or spoke-heads—as previously mentioned; then complete the rim by connecting the edges of the trough, which may be formed into a circle and its ends connected, either before or after the strain-bearing pieces are inserted. After the strain-bearing pieces are inserted and connected to the hub by spokes in the usual manner, I mount the hub on suitable bearings upon which it can revolve, and apply to the rim suitably-formed rollers. The wheel is then revolved in contact with said rollers, and a shoulder or channel is thereby formed in each of the edges of the trough, the form of which shoulders I do not here claim, it being shown in my application, No. 246,230. The channel or shoulder thus formed is to receive the edges of another strip, F, made by any well-known process and adapted to fit therein. I then proceed to bend the edges of one of the strips over the edges of the other while the hub is still held in its bearings to locate the position of the rim. In regard to tools for bending these edges, they may be of any form or number to do the work required. Although pressing-dies will do the work, I prefer to use rollers, and to make them conform to the outside or inside of the rim, and to gear them to a driving-pulley that they may themselves cause the rim with its spokes and hub to revolve and present successive parts to the rollers, which finally firmly join the edges of the trough and the edges of the other strip.

It will be seen that a double purpose is served in revolving the wheel in contact with such rollers. At the same time that the work above described is being done the rim is being formed into a perfect circle, since both the bearing of the hub and the rollers at the rim are rigid.

Other forms of wheel-rim can be constructed in the same manner, and I do not desire to be limited to the construction of the particular form shown in the drawings, the process being applicable to other-shaped rims.

I claim—

The hereinabove-described process of forming vehicle-wheels, which consists of, first, forming a strip of metal into a trough; second, bending the trough to the circumference of the rim; third, inserting the spokes and securing them to the hub; fourth, mounting the hub upon bearings; fifth, revolving the wheel upon such bearings with the rim in contact with forming-tools, whereby the channel or shoulder is turned upon each of its edges; sixth, applying to the rim another strip of metal adapted to engage with the channels or shoulders, whereby the channels of the trough are connected, substantially as set forth.

THOS. B. JEFFERY.

In presence of—
 E. F. BURTON,
 CHAS. S. BURTON.